(12) United States Patent
Lo et al.

(10) Patent No.: US 12,348,334 B2
(45) Date of Patent: Jul. 1, 2025

(54) VIRTUAL NETWORK IDENTIFIER TRANSLATION

(71) Applicant: Arista Networks, Inc., Santa Clara, CA (US)

(72) Inventors: Alton Lo, Fremont, CA (US); Ian McCloghrie, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/349,785

(22) Filed: Jul. 10, 2023

(65) Prior Publication Data

US 2025/0023757 A1 Jan. 16, 2025

(51) Int. Cl.
*H04L 12/46* (2006.01)
*H04L 12/66* (2006.01)

(52) U.S. Cl.
CPC ...... *H04L 12/4679* (2013.01); *H04L 12/4633* (2013.01); *H04L 12/66* (2013.01)

(58) Field of Classification Search
None
See application file for complete search history.

(56) References Cited

U.S. PATENT DOCUMENTS

| | | | | |
|---|---|---|---|---|
| 10,243,834 B1* | 3/2019 | Shekhar | ................. | H04L 45/64 |
| 11,336,515 B1 | 5/2022 | Mehta et al. | | |
| 11,456,892 B1* | 9/2022 | Uttaro | ................. | H04L 12/4679 |
| 11,575,541 B1* | 2/2023 | Styszynski | ........... | H04L 12/4633 |
| 11,888,652 B2* | 1/2024 | Yu | ............................ | H04L 12/46 |
| 11,902,160 B2* | 2/2024 | Lin | ..................... | H04L 12/4641 |
| 2015/0326469 A1* | 11/2015 | Kern | .................... | H04L 41/0866 370/254 |
| 2018/0109436 A1* | 4/2018 | Sajassi | .................... | H04L 41/12 |
| 2019/0081888 A1* | 3/2019 | Saltsidis | ................. | H04L 47/76 |
| 2021/0234898 A1* | 7/2021 | Desai | .................... | H04L 63/104 |
| 2022/0321469 A1* | 10/2022 | Qian | .................. | H04L 12/4633 |
| 2022/0385564 A1* | 12/2022 | Langemak | ........... | H04L 45/507 |
| 2022/0417058 A1* | 12/2022 | Jagadeesan | .......... | H04L 63/029 |
| 2023/0113654 A1* | 4/2023 | Kottapalli | .............. | H04L 45/02 370/392 |

FOREIGN PATENT DOCUMENTS

WO  WO-2018109536 A1 * 6/2018

\* cited by examiner

*Primary Examiner* — Phyllis A Book
(74) *Attorney, Agent, or Firm* — Treyz Law Group, P.C.; Tianyi He (57) ABSTRACT

A first network device for a first virtual network identifier (VNI) domain may be coupled to a second network device for a second VNI domain via an interconnect network. When serving as the downstream network device for processing network traffic from the first VNI domain to the second VNI domain, the second network device may perform remote VNI to local VNI translation for the network traffic, thereby facilitating proper network traffic handling even in network configurations in which the first network device is not configured to perform downstream VNI translation. If desired, instead of or in addition to performing VNI translation for its own VNI domain, the second network device may serve as a service device to perform VNI translation for a third VNI domain.

16 Claims, 7 Drawing Sheets

VIRTUAL NETWORK IDENTIFIER TRANSLATION

BACKGROUND

This relates to network devices, and more particularly, to network devices of different network domains.

Network devices such as border gateways or routers may be present between an interconnect network and respective network domains. These network devices may be configured to handle traffic traversing between the network domains.

DETAILED DESCRIPTION

A network can convey network traffic (e.g., in the form of one or more packets, one or more frames, etc.) between host devices. To properly forward the network traffic, the network can include a number of network devices. Some of these network devices may implement an Ethernet Virtual Private Network (EVPN) by exchanging network reachability information in the form of EVPN route information with one another and by processing the exchanged information. These network devices are sometimes referred to herein as EVPN peer network devices, EVPN peer devices, EVPN devices, and/or EVPN speakers.

Configurations in which the exchange of EVPN route information (e.g., MAC and IP address advertisement route information) occurs using Border Gateway Protocol (BGP), or more specifically Multiprotocol BGP (MP-BGP), and/or with Virtual Extensible Local Area Network (VXLAN) or Multiprotocol Label Switching (MPLS) tunneling technology (e.g., using VXLAN or MPLS infrastructure, MPLS labels, etc.) are sometimes described herein as illustrative examples. If desired, the exchange of network reachability information can occur with other types of control plane routing protocol and/or utilizing other types of core network overlay infrastructure.

Different network domains or sites may be interconnected via an interconnect network over which EVPN route information is conveyed. In some illustrative configurations described herein as an example, a first network domain such as a first EVPN site may have a virtual network identifier (VNI) such as a VXLAN identifier that is different than a VNI of another network domain such as a second EVPN site in the same EVPN domain. While compatible devices for the two VNI domains may suitably handle traffic processing to enable traffic traversal across the two VNI domains, some illustrative network implementations may contain incompatible devices. As illustrative examples of incompatibility, the two VNI domains may be administered by different non-cooperating entities, and/or one VNI domain may be served by a legacy device while the other VNI domain is served by a newer device having different functions. Accordingly, it may be desirable to provide satisfactory traffic processing to enable traffic traversal across the two VNI domains having different VNIs even in these network configurations containing incompatible network devices.

Figure 1:
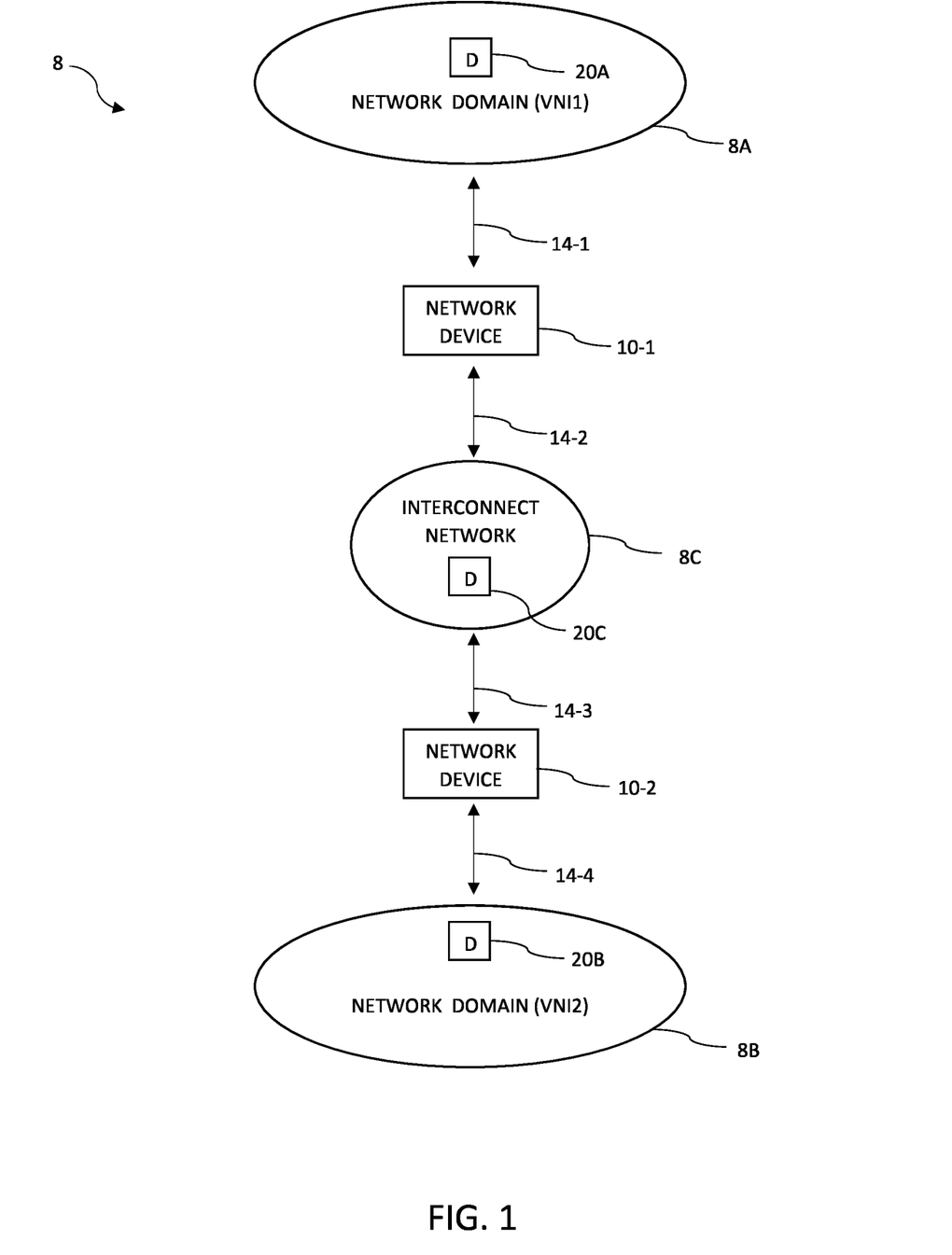
FIG. 1 is a diagram of an illustrative network having multiple network domains in accordance with some embodiments.

An illustrative networking system in which network devices, such as two network devices for respective network domains, operate is shown in FIG. 1. A network such as network 8 may be of any suitable scope and/or form part of a larger network of any suitable scope. As examples, network 8 may include, be, or form part of one or more local segments, one or more local subnets, one or more local area networks (LANs), one or more campus area networks, a wide area network, etc. Network 8 may include any suitable number of different network devices that connect corresponding host devices of network 8 to one another. If desired, network 8 may include or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

As shown in FIG. 1, network 8 may include interconnect network 8C (sometimes referred to as core network 8C) interconnecting different edge networks or edge network portions (sometimes referred to herein as sites or domains) such as network domains 8A and 8B. As one illustrative example, interconnect network 8C may be or form at least part of a core or backbone network such as a service provider network (e.g., an Internet or IP service provider network, a MPLS network, a cloud provider network, or generally a communication network core). In configurations in which network devices such as network devices 10-1 and 10-2 implement one or more EVPN instances over interconnect network 8C, interconnect network 8C may sometimes be referred to herein as an EVPN core or generally an underlay network for EVPN.

In some configurations described herein as an illustrative example, network devices 10-1 and 10-2 may be border gateways or routers for their respective network domains 8A and 8B. Network domains 8A and 8B may be different datacenter EVPN sites interconnected by a datacenter interconnect (DCI) network such as interconnect network 8C. If desired, network 8 may have other suitable configurations (e.g., where domains 8A and 8B are not datacenter sites and/or interconnect network 8C is not a DCI network).

Network domain 8A may have any suitable number of network devices 20A that are interconnected to each other in order to support the handling and conveyance of traffic to and from end host devices of network domain 8A. Similarly, network domains 8B may have any suitable number of network devices 20B that are interconnected to each other in order to support the handling and conveyance of traffic to and from end host devices of network domain 8B.

Interconnect network 8C may also include any suitable number of network devices 20C that are interconnected to each other in order to support the handling and conveyance of traffic between network domains 8A and 8C and/or between other (pairs of) network domains. Network device 10-1 may be a border gateway of network domain 8A that serves as an interface between one or more edge network devices 20C in interconnect network 8C and other network devices 20A in network domain 8A. Network device 10-2 may be a border gateway of network domain 8B that serves as an interface between one or more edge network devices 20C in interconnect network 8C and other network devices 20B in network domain 8B. Accordingly, network devices 10-1 and 10-2 may sometimes be referred to as edge network devices of their respective network domains 8A and 8B.

Respective network paths 14 (e.g., one or more paths 14-1, one or more paths 14-2, one or more paths 14-3, one or more paths 14-4, and/or other network paths) may couple network devices within each network domain and/or may couple each network domain to interconnect network 8C.

Network devices in network 8 such as network devices 10-1, 10-2, 20A, 20B, and 20C may each include or be a switch (e.g., a multi-layer L2/L3 switch), a bridge, a router, a gateway, a hub, a repeater, a firewall, a wireless access point, a network device serving other networking functions, a network device that includes the functionality of two or more of these devices, a management device that controls the operation of one or more of these network devices, and/or other types of network devices. Configurations in which network devices 10-1 and 10-2 are gateways or generally routers are described herein as an illustrative example. Configurations in which network devices 20A and 20B include spine switches and leaf (e.g., top-of-rack) switches are described herein as an illustrative example.

Host devices or host equipment in network 8 such as end host devices of network domains 8A and 8B (e.g., serving as end hosts of network devices 20A and 20B) may each include or be a computer, a server or virtual machine implemented on server equipment, a portable electronic device such as a cellular telephone, a laptop, etc., a network service and/or storage device, network management equipment that manages and controls the operation of one or more of host devices and network devices, and/or any other suitable types of specialized or general-purpose host computing equipment, e.g., running one or more client-side and/or server-side applications. Configurations in which at least some of these end host devices of domains 8A and 8B are implemented on server equipment (e.g., forming compute servers, storage servers, and/or management servers) are sometimes described herein as an illustrative example.

Network paths 14 connecting networking equipment (e.g., network devices and end host devices) in network 8 may be formed from one or more wired technologies or standards such as Ethernet (e.g., using copper cables and/or fiber optic cables), thereby forming a wired network portion of network 8 (e.g., forming at least part of interconnect network 8C and/or network domains 8A and 8B). If desired, network 8 may also include one or more wireless network portions that extend from the wired network portion.

In some configurations described herein as an example, network devices 10-1 and 10-2 may implement EVPN (e.g., one or more EVPN instances) over interconnect network 8C, and accordingly, may be referred to as EVPN peer devices with respect to each other. In these illustrative configurations, the EVPN peer devices may exchange EVPN route information such as EVPN NLRIs with one another over interconnect network 8C. EVPN NLRIs may contain different types of route information such as Ethernet auto-discovery route information, MAC and IP address advertisement route information, and other types of EVPN route information (e.g., generally BGP EVPN routes as specified in RFC 7432). The EVPN route information (e.g., conveyed using BGP messages containing the EVPN route information) may be exchanged based on any suitable underlying transport layer and internet layer protocol(s) that facilitate communication across underlay network 8C. Underlay network 8C (and the devices 20C therein) may provide and implement underlying infrastructure over which a VXLAN or MPLS overlay network (e.g., containing one or more corresponding tunnels) is implemented.

In the example of FIG. 1, network domain 8A may be a first EVPN site having a first virtual network identifier (VNI) VNI1 and network domain 8B may be a second EVPN site having a second VNI VNI2. These two EVPN sites may be interconnected via underlay network 8C using EVPN speakers (e.g., network devices 10-1 and 10-2). Configurations in which interconnect network 8C implements a VXLAN overlay are sometimes described herein as an illustrative example. In these configurations, the virtual network identifiers of network domains 8A and 8B may refer to VXLAN identifiers in VXLAN headers used to encapsulate network packets for transport over interconnect network 8C.

Figure 2:
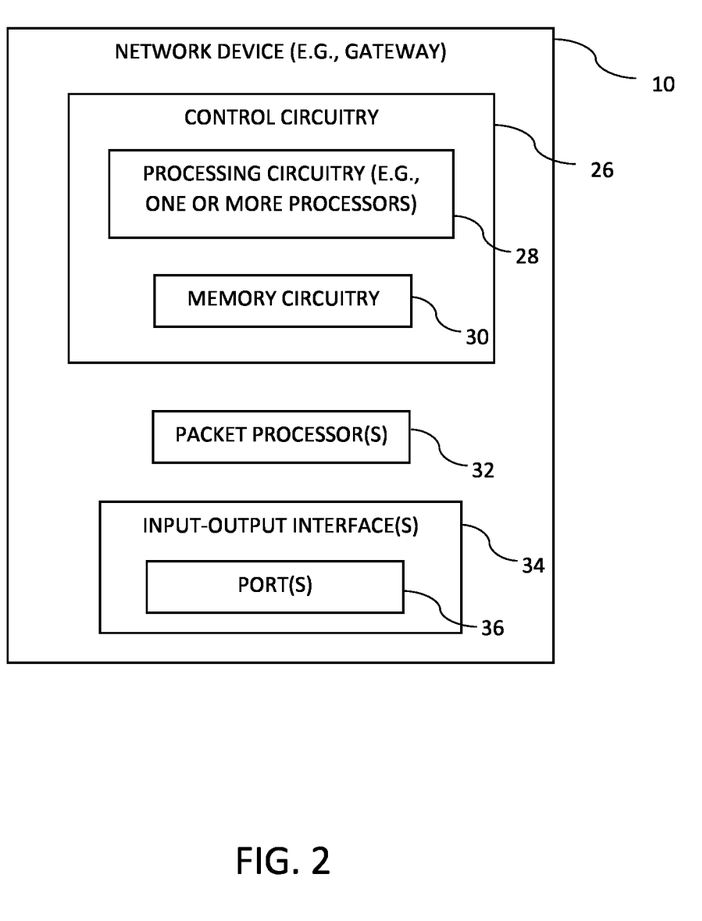
FIG. 2 is a diagram of an illustrative network device in accordance with some embodiments.

FIG. 2 is a diagram of an illustrative network device 10 that may implement one or more of network devices 10-1, 10-2, 20A, 20B, and/or 20C in FIG. 1. In some instances (e.g., where network device 10 in FIG. 2 is used to implement EVPN speakers such as network devices 10-1 and 10-2 in FIG. 1), network device 10 may be configured to exchange routing information with other EVPN devices. In other instances (e.g., where network device 10 in FIG. 2 implements one or more of network devices 20A, 20B and 20C in FIG. 1), network device 10 may have at least some (e.g., all) of the same components as network device 10 depicted in FIG. 2 but may optionally omit execution of a BGP and/or EVPN process at the processing circuitry.

As shown in FIG. 2, network device 10 may include control circuitry 26 having processing circuitry 28 and memory circuitry 30, one or more packet processors 32, and input-output interfaces 34 mounted to a substrate of network device 10 and/or disposed within a housing of network device 10. In one illustrative arrangement, network device 10 may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10 may be a fixed-configuration network device (e.g., a fixed-configuration switch having a fixed number of ports and/or a fixed hardware configuration).

Processing circuitry 28 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 28 may run (e.g., execute) a network device operating system and/or other software/firmware that is stored on memory circuitry 30. Memory circuitry 30 may include non-transitory (tangible) computer readable storage media that stores the operating system software and/or any other software code, sometimes referred to as program instructions, software, data, instructions, or code. As an example, the BGP and/or EVPN routing functions performed by network device 10 described herein may be stored as (software) instructions on the non-transitory computer-readable storage media (e.g., in portion(s) of memory circuitry 30 in network device 10). The corresponding processing circuitry (e.g., one or more processors of processing circuitry 28 in network device 10) may process or execute the respective instructions to perform the corresponding BGP and/or EVPN routing functions. Memory circuitry 30 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 10), and/or other storage circuitry. Processing circuitry 28 and memory circuitry 30 as described above may sometimes be referred to collectively as control circuitry 26 (e.g., implementing a control plane of network device 10).

As just a few examples, processing circuitry 28 may execute network device control plane software such as operating system software, routing policy management software, routing protocol agents or processes (e.g., BGP and/or EVPN process), routing information base agents, and other control software, may be used to support the operation of protocol clients and/or servers (e.g., to form some or all of a communications protocol stack such as the TCP/IP stack), may be used to support the operation of packet processor(s) 32, may store packet forwarding information, may execute packet processing software, and/or may execute other software instructions that control the functions of network device 10 and the other components therein.

Packet processor(s) 32 may be used to implement a data plane or forwarding plane of network device 10. Packet processor(s) 32 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 32 may receive incoming network traffic via input-output interfaces 34, parse and analyze the received network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 30 and/or other memory circuitry integrated as part of or separate from packet processor 32.

Input-output interfaces 34 may include different types of communication interfaces such as Ethernet interfaces, optical interfaces, a Bluetooth interface, a Wi-Fi interface, and/or other networking interfaces for connecting network device 10 to the Internet, a local area network, a wide area network, a mobile network, and generally other network device(s), peripheral devices, and other computing equipment (e.g., host equipment such as server equipment, user equipment, etc.). As an example, input-output interfaces 34 may be formed using and therefore include physical ports 36 (e.g., Ethernet ports, optical fiber ports, etc.) to which corresponding mating connectors of external components can be physically coupled and electrically connected. Ports may have different form-factors to accommodate different cables, different modules, different devices, or generally different external equipment.

In configurations in which network device 10 implements EVPN with EVPN peer devices using BGP, processing circuitry 28 on network device 10 may execute a BGP EVPN process (sometimes referred to herein as a BGP EVPN agent). The BGP EVPN process may manage and facilitate operations as defined by or relevant to BGP and/or EVPN such as the exchange of network layer reachability information (e.g., EVPN NLRIs in the form of different EVPN routes) with other peer devices and the processing of the exchanged information. If desired, an EVPN agent or process may be implemented separately from a BGP agent or process.

As some examples of illustrative operations performed by processing circuitry 28, the EVPN process executing on processing circuitry 28 may receive peer-advertised information such as EVPN routes in the form of Ethernet auto-discovery routes, MAC and IP advertisement routes and/or other types of EVPN routes, may perform path selection (e.g., best path computation based on BGP) using the peer-advertised information and/or other information, may advertise outbound information such as EVPN routes to its peers, and/or may perform other BGP and/or EVPN functions.

While the BGP EVPN process is sometimes described herein to perform respective parts of BGP and/or EVPN operations for device 10, this is merely illustrative. Processing circuitry 28 may be organized in any suitable manner (e.g., to have any other agents or processes instead of or in addition to a single BGP EVPN process) to perform different parts of the BGP and/or EVPN operations. Accordingly, processing circuitry 28 may sometimes be described herein to perform the BGP and/or EVPN operations instead of specifically referring to one or more agents, processes, and/or the kernel executed by processing circuitry 28.

Given the differing VNIs for network domains 8A and 8B in FIG. 1 (sometimes referred to herein as VNI domains 8A and 8B), network devices 10-1 and 10-2, serving as corresponding gateways for their respective domains 8A and 8B may perform VNI translation operations for network traffic traversing between domains 8A and 8B.

Figure 3:
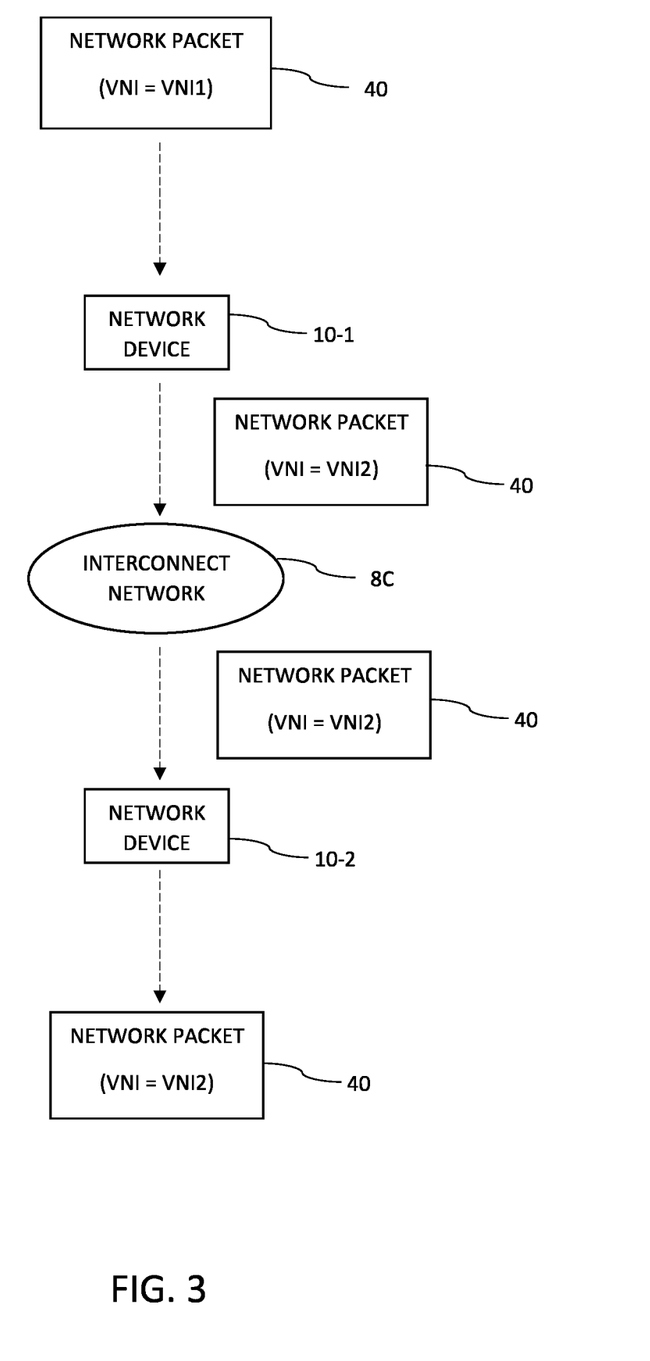
FIG. 3 is a diagram of illustrative network traffic from a first network domain to a second network domain in accordance with some embodiments.

FIG. 3 is a diagram of an illustrative path taken by host network traffic such as network packet 40 originating from network domain 8A in FIG. 1 (e.g., from an end host device coupled to network device 20A) and destined for network domain 8B in FIG. 1 (e.g., destined for an end host device coupled to network device 20B) when traversing across network 8 (FIG. 1). Packet 40, when encapsulated for transport to its destination (e.g., by a device 20A in FIG. 1 implementing a virtual tunnel endpoint), may have header information containing L2 VNI VNI1. As an example, a VXLAN header of packet 40 may identify VNI1 as the VXLAN identifier.

Network device 10-1 (sometimes referred to as the upstream network device relative to network device 10-2 further along the path of packet traversal) may receive packet 40 that identifies the local L2 VNI VNI1 (e.g., the VNI of source domain 8A for which network device 10-1 is a gateway). Upstream network device 10-1 may perform a translation operation such that local L2 VNI VNI1 of the packet is translated into the remote L2 VNI VNI2 associated with destination domain 8B containing the host device (e.g., coupled to network device 20B) for which packet 40 is destined.

Network device 10-1 may perform this type of downstream translation using and/or generally based on local VNI to remote VNI routing information stored on a table or other data structure maintained on upstream network device 10-1. In particular, network device 10-1 may maintain (e.g., store and/or update) the local VNI to remote VNI translation information based on an advertisement message (e.g., an EVPN route advertisement message) advertised by network device 10-2 containing VNI VNI2. By processing the advertisement message, network device 10-1 may learn of remote VNI VNI2 for domain 8B for which network device 10-2 is a gateway and store remote VNI VNI2 as part of the local VNI to remote VNI routing information. Accordingly, network device 10-1 may decapsulate packet 40 containing local VNI VNI1 (e.g., in the VXLAN header of packet 40) and may encapsulate the decapsulated packet 40 with remote VNI VNI2 (e.g., in the VXLAN header of the newly encapsulated packet 40) to perform the VNI translation operation. If desired, the operation to replace VNI VNI1 with VNI VNI2 for packet 40 may be performed in any suitable manner.

Network device 10-1 may output packet 40 containing remote L2 VNI VNI2 in its header for conveyance across interconnect network 8C and to network device 10-2 (sometimes referred to as the downstream network device relative to network device 10-1 along the path of packet traversal). Network device 10-2 may appropriately process and/or forward packet 40 based on the remote VNI VNI2 contained in the header of packet 40 (e.g., forward packet 40 to network device 20B in domain 8B).

However, not all network devices when serving as upstream network devices (e.g., network device 10-1) are configured to perform the VNI translation operation as described in connection with FIG. 3. As one illustrative example, legacy network devices (e.g., in brownfield deployments) may not be configured with such a translation functionality. It may therefore be desirable to reconcile this deficiency of network devices being unable or not configured to perform the local VNI to remote VNI translation for downstream network devices.

Figure 4:
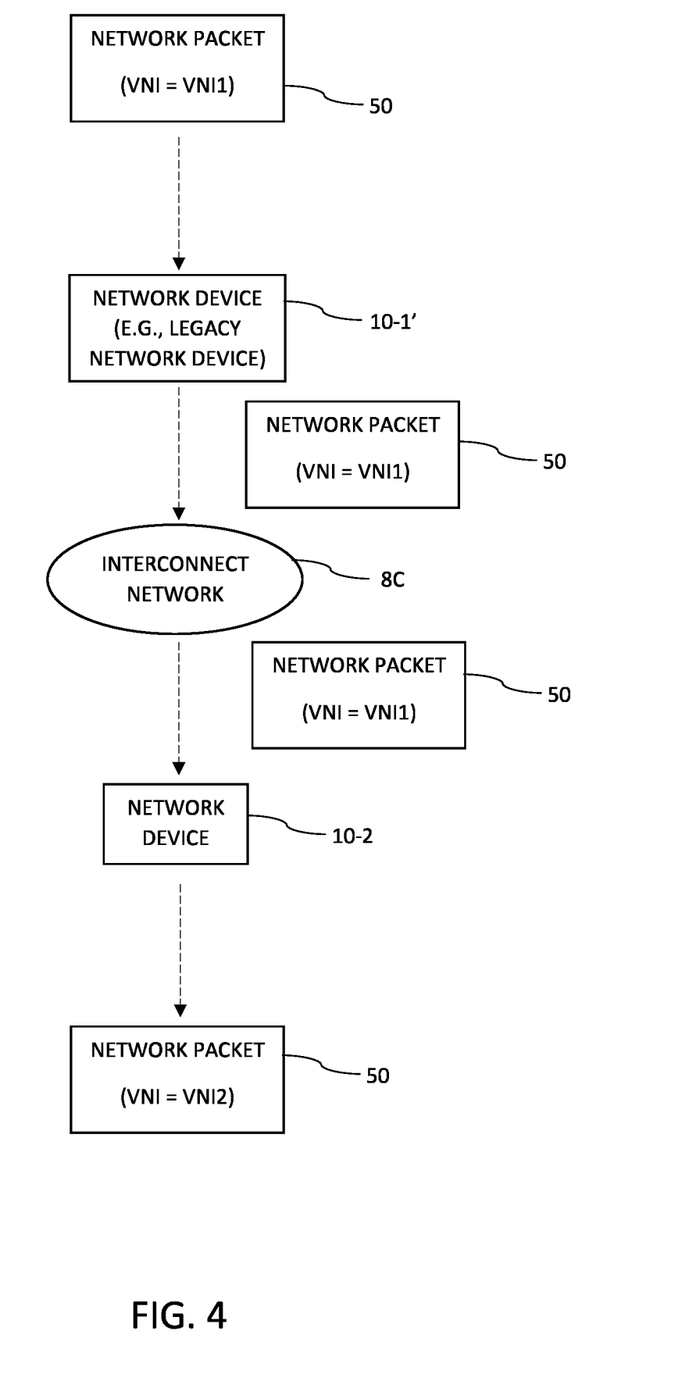
FIG. 4 is a diagram of illustrative network traffic from a first network domain to a second network domain traversing a legacy network device in accordance with some embodiments.

FIG. 4 is a diagram of an illustrative path taken by host network traffic such as network packet 50 originating from network domain 8A in FIG. 1 (e.g., from an end host device coupled to network device 20A) and destined for network domain 8B in FIG. 1 (e.g., destined for an end host device coupled to network device 20B) when traversing across network 8 (FIG. 1). In the example of FIG. 4, device 10-1 may be a legacy network device or generally a network device not configured to perform local VNI to remote VNI translation such as the translation operation described in connection with FIG. 3. In this scenario, device 10-1 of this type may sometimes be referred to herein as network device 10-1'.

Similar to the example of FIG. 3, packet 50 in FIG. 4, when encapsulated for transport to its destination (e.g., by a device 20A in FIG. 1 implementing a virtual tunnel endpoint), may have header information containing L2 VNI VNI1. As an example, a VXLAN header of packet 50 may identify VNI1 as the VXLAN identifier. Upstream network device 10-1' may receive packet 50 that identifies the local L2 VNI VNI1 (e.g., the VNI of source domain 8A for which network device 10-1' is a gateway). Upstream network device 10-1' may not be configured to or generally may be unable to perform a local VNI to remote VNI translation operation that would otherwise replace local L2 VNI VNI1 with remote L2 VNI VNI2 associated with the remote destination domain. Accordingly, network device 10-1' may process and/or forward packet 50 such that the local VNI VNI1 in the header information of packet 50 remains unchanged upon output by network device 10-1'.

Packet 50 containing VNI VNI1 output by network device 10-1' may traverse interconnect network 8C and be received by downstream network device 10-2. To reconcile the lack of local VNI to remote VNI translation operation at upstream network device 10-1', downstream network device 10-2 may be configured to perform the remote VNI to local VNI translation for packet 50 to replace the VNI VNI1 in the header of packet 50 with VNI VNI2. From the perspective of downstream network device 10-2, VNI VNI1 carried by packet 50 upon reception is the remote VNI (e.g., corresponding to the remote domain 8A) and VNI VNI2 is the local VNI (e.g., corresponding to the local domain 8A of network device 10-2). As such, this VNI translation operation performed by downstream network device 10-2 (in place of the local to remote VNI translation described in connection with FIG. 3) may be referred to herein as a remote VNI to local VNI translation.

Similar to the example of FIG. 3, a packet (e.g., packet 50 in FIG. 4) output from downstream network device 10-2 may include the appropriate VNI (e.g., VNI VNI2) corresponding to destination network domain 8B. As such, network devices 20B (e.g., a network device 20B implementing a virtual tunnel endpoint) in network domain 8B may appropriately process network packet 50 based on VNI VNI2 resulting from the remote VNI to local VNI translation operation performed by network device 10-2.

Figure 5:
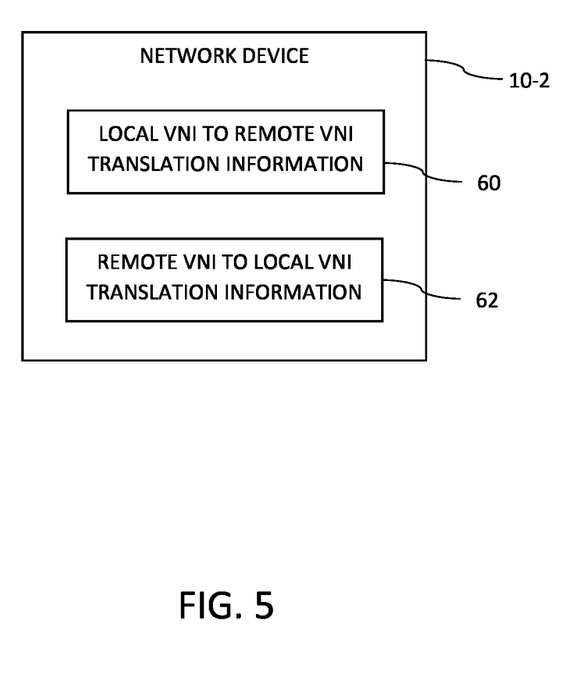
FIG. 5 is a diagram of illustrative virtual network identifier translation information maintained by a network device to perform various types of virtual network identifier translation in accordance with some embodiments.

FIG. 5 is a diagram of illustrative VNI translation information that may be stored at downstream network device 10-2. In particular, network device 10-2 may include memory circuitry (e.g., memory circuitry 30 of control circuitry 26 and/or memory circuitry of packet processor(s) 32). The memory circuitry of network device 10-2 may store the VNI translation information such as local VNI to remote VNI translation information 60 and remote VNI to local VNI translation information 62. The control circuitry (e.g., control circuitry 26) of network device 10-2 may maintain local VNI to remote VNI translation information 60 for all remote domains. The control circuitry of network device 10-2 may maintain remote to local VNI translation information 62 for remote domains having gateways unable to perform local VNI to remote VNI translation. In particular, in response to determining that a gateway is unable to perform local VNI to remote VNI translation, the control circuitry of network device 10-2 may maintain remote to local VNI translation information 62 for that gateway.

While in the examples of FIGS. 3 and 4 network device 10-2 serves as the downstream device for network traffic sourced from network domain 8A and destined for network domain 8B, this is illustrative of one of many types of network traffic processed by network device 10-2. For other network traffic (e.g., network traffic sourced from network domain 8B and destined for network domain 8A), network device 10-2 may serve as the upstream device and network device 10-1 (or network device 10-1') may serve as the downstream device.

When serving as the upstream network device, network device 10-2 may use local VNI to remote VNI translation information 60 to perform local VNI to remote VNI translation in a similar manner described in connection with upstream network device 10-1 in the example of FIG. 3.

When serving as the downstream network device (e.g., for a legacy network device or other network device 10-1' in FIG. 4 not configured to perform local VNI to remote VNI translation), network device 10-2 may use remote VNI to local VNI translation information 62 to perform the desired VNI translation (e.g., in place of the local VNI to remote VNI translation expected but unable to be performed by upstream network device 10-1').

Network device 10-2 may obtain VNI translation information 60 and/or 62 based on routing protocols executing on network device 10-2 and peer network devices. In particular, network device 10-2 may receive advertisement messages (e.g., EVPN type-2 and/or type-3 route advertisement messages) from network device 10-1' that provide routing information associating host address information (e.g., VTEP IP at domain 8A) with the corresponding L2 VNI of domain 8A. In particular, these types of advertisement messages may contain the remote VNI used to populate remote VNI to local VNI translation information 62.

As one illustrative example, network device 10-1' may transmit an advertisement message containing its local VNI VNI1 and network device 10-2, upon reception and processing of the advertisement message, may store VNI VNI1 as the remote VNI in remote VNI to local VNI translation information 62. Upon performing a lookup operation using packet header information (e.g., packet destination MAC and VLAN ID), network device 10-2 may identify VNI VNI1 as being present in information 62 and requiring a remote VNI to local VNI translation. If desired, network device 10-2 may obtain the VNI translation information 62 (and/or information 60) through static configuration (e.g., as configuration data received via user input).

If desired, network device 10-2 may maintain remote VNI to local VNI translation information 62 only for one or more upstream devices determined by network device 10-2 as being unable to perform local VNI to remote VNI translation such as network device 10-1' in FIG. 4. In other words, remote VNI to local VNI translation information 62 may include information indicative of the remote VNI of each source domain having a gateway of the same type as network device 10-1' in FIG. 4 (e.g., lacking the capability to perform local VNI to remote VNI translation).

One or more packet processors 32 of network device 10-2 may be configured to access information 60 and/or 62 to perform packet processing operations (e.g., when processing packet 50 in FIG. 4). In particular, packet processor 32 of network device 10-2 may perform a lookup operation using the header information of the network packet to determine whether a remote VNI to local VNI translation is desired. If the remote VNI to local VNI translation is desired, network device 10-2 may decapsulate the header of the packet (e.g., packet 50 in FIG. 4) containing the remote VNI (e.g., VNI VNI1 in the example of FIG. 4), identify the corresponding local VNI (e.g., VNI VNI2 in the example of FIG. 4) based on the remote VNI to local VNI translation information 62, and encapsulate the decapsulated packet with the identified local VNI.

Figure 6:
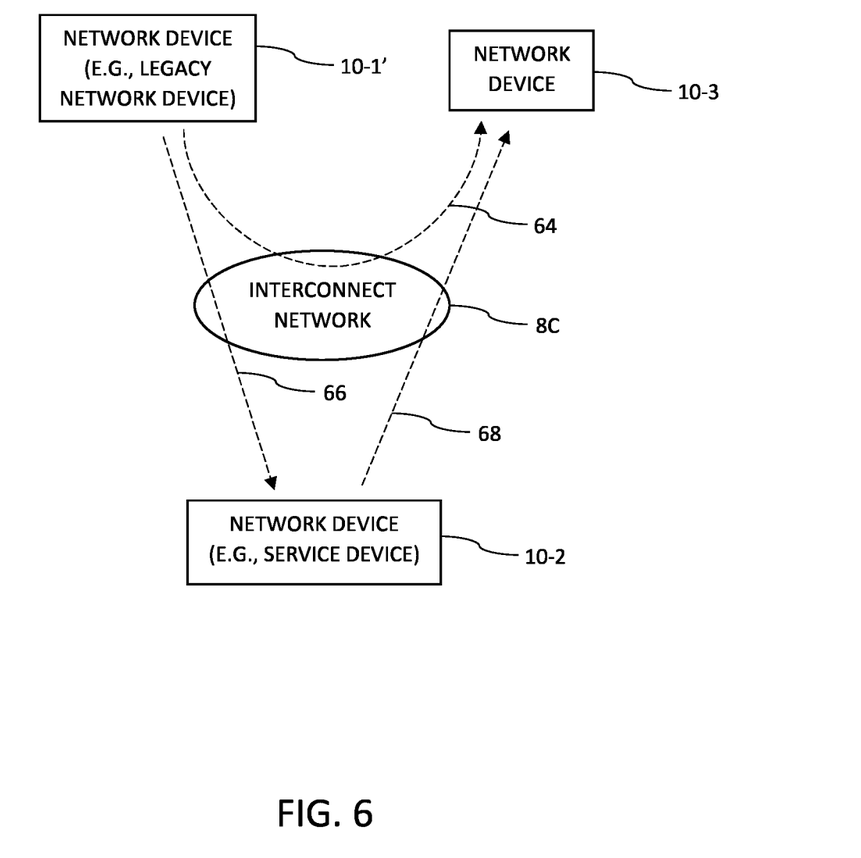
FIG. 6 is a diagram of an illustrative first network device serving as a service device that performs virtual network identifier translation for network traffic from a second network device to a third network device in accordance with some embodiments.

FIG. 6 is a diagram of an illustrative network configuration in which network device 10-2 of FIGS. 4 and 5 may serve as a service device for a third network device such as network device 10-3 (e.g., a border gateway or router) of a third network domain having a third VNI different from the VNIs of VNI domains 8A and 8B (FIG. 1). In particular, network device 10-3 may not include the functionality to perform remote VNI to local VNI translation to reconcile the lack of local VNI to remote VNI translation capability of network device 10-1' (e.g., as described in connection with FIG. 4). Accordingly, network traffic originating from the local VNI domain of network device 10-1' and destined for the local VNI domain of network device 10-3 via interconnect network 8C (e.g., following network path 64) may be improperly processed because neither network device 10-1' nor network device 10-3 is configured to perform the appropriate VNI translation (e.g., from the local VNI of network device 10-1' to the local VNI of network device 10-3).

In this type of network configuration, network device 10-2 may serve as a service device (sometimes referred to as a service gateway) for network devices 10-1' and 10-3 to service the above-mentioned network traffic along network path 64. In particular, network device 10-1' may store a specified desired route for the network traffic destined for the local VNI domain of network device 10-3 that includes traversal through service network device 10-2. Accordingly, the network traffic may be forwarded to service network device 10-2 along network path 66.

Upon reception of the network traffic along network path 66, network device 10-2 may perform a remote VNI to local VNI translation based on information 60 and 62 by decapsulating network packets containing the VNI of the local VNI domain of network device 10-1' and thereafter encapsulating the network packets to contain the VNI of the local VNI domain of network device 10-3.

If desired, this may be performed using a two-step VNI translation operation. First, network device 10-2 may decapsulate network packets containing the VNI of the local VNI domain of network device 10-1' and encapsulate the network packets to contain the VNI of the local VNI domain of network device 10-2 using remote VNI to local VNI translation information 62. Second, network device 10-2 may decapsulate the network packets containing the VNI of the local VNI domain of network device 10-2 and encapsulate the network packets to contain the VNI of the local VNI domain of network device 10-3 using local VNI to remote VNI translation information 60.

The network traffic containing the appropriate VNI header information (e.g., the VXLAN identifier header information) for the local domain of network device 10-3 may subsequently be forwarded from network device 10-2 to network device 10-3 via network path 68 through network 8C. Accordingly, the network traffic sourced from the local VNI domain of network device 10-1' and destined for the local VNI domain of network device 10-3 may be received by network device 10-3 with the local VNI of the VNI domain of network device 10-3 and may therefore be appropriated processed by network devices in the VNI domain of network device 10-3.

In such a manner, network device 10-2 may serve as a border gateway for a VNI domain and/or as a service gateway that performs the appropriate VNI translations for other VNI domain(s) such as the local VNI domain of network device 10-3.

Figure 7:
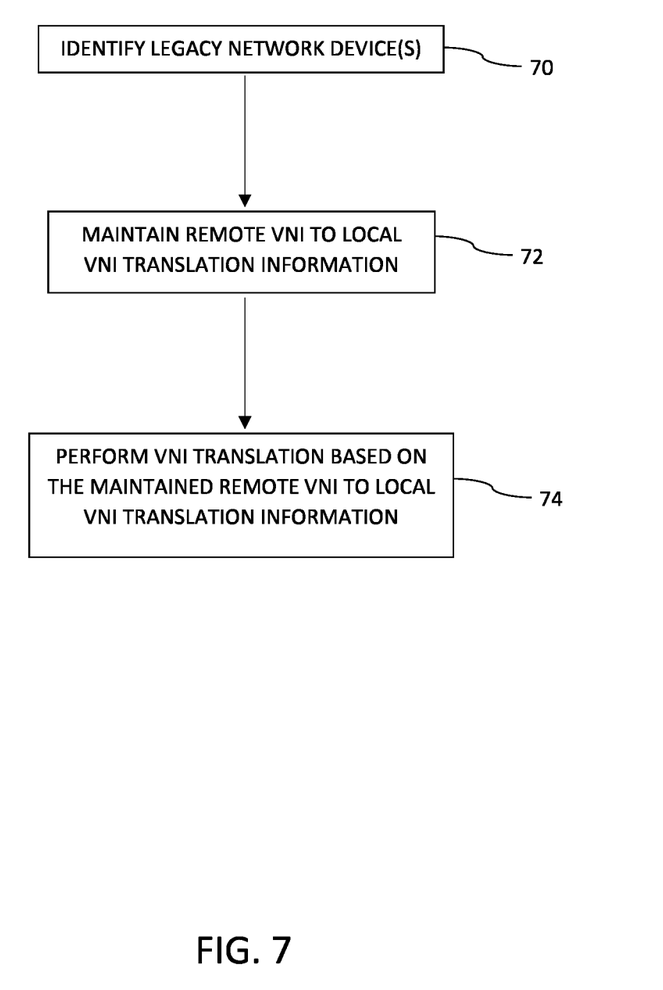
FIG. 7 is a flowchart of illustrative operations for handling virtual network identifier translation in accordance with some embodiments.

FIG. 7 is a flowchart of illustrative operations for operating a network device such as a border gateway or router to perform VNI translation. These operations may be performed at control plane control circuitry 30 in network device 10-2 (FIGS. 4-6) and/or data plane packet processor(s) 32 in network device 10-2 (FIGS. 4-6). The illustrative operations described in connection with FIG. 7 performed by one or more processors (e.g., processing circuitry and/or packet processors) in network device 10-2 may be performed by executing software instructions stored on corresponding memory circuitry 30 (e.g., one or more non-transitory computer-readable media). If desired, one or more operations described in connection with FIG. 7 may be performed by other dedicated hardware components in network device 10-2.

At block 70, control circuitry 30 on a network device such as device 10-2 (FIGS. 4-6) may identify one or more legacy network devices or generally network devices, such as network device 10-1' and/or network device 10-3, that are not configured or are unable to perform the appropriate VNI translation(s). In particular, network devices 10-1' and/or 10-3 may send advertisement messages to network device 10-2.

Upon reception and processing of these advertisement messages containing device attributes and/or other device identifying information, network device 10-2 may determine that network device 10-1' is unable to perform downstream VNI translation (sometimes referred to herein as local VNI to remote VNI translation). If desired, network device 10-2 may receive configuration data (e.g., based on user input) indicative of the local VNI to remote VNI translation capability of network device 10-1'. If desired, network device 10-2 may also determine that network device 10-3 is unable to perform VNI translation, in which case device 10-2 may serve as an intermediate service device (e.g., as described in connection with FIG. 6). These determinations may cause network device 10-2 to maintain corresponding VNI translation information for network device 10-1' and/or network device 10-3 at block 72 (e.g., information 62 for network device 10-1' and/or information 60 for network device 10-3 in FIG. 5).

At block 72, control circuitry 30 on the network device such as device 10-2 (FIGS. 4-6) may maintain remote VNI to local VNI translation information 62. In the examples of FIGS. 4-6, remote VNI to local VNI translation information 62 may be maintained for device 10-1' based on its lack of downstream VNI translation capability. If desired, other remote VNI to local VNI translation information 62 may be maintained for other network devices that lack downstream VNI translation capability. These types of remote VNI to local VNI translation information 62 may be stored alongside local VNI to remote VNI translation information 60, which is used for downstream VNI translation performed by network device 10-2 (e.g., for traffic from device 10-2 to device 10-1') and/or for servicing other network traffic (e.g., traffic from device 10-1' to device 10-3 passing through intermediate service device 10-2).

VNI translation information 60 and 62 may generally be accessible to one or more packet processors 32 on the network device such that the one or more packet processors 32 can perform the encapsulation, decapsulation, lookup, and/or other operations desired to perform the VNI translation. As an example, VNI translation information 60 and 62 may be maintained at memory circuitry of the one or more processors 32. If desired, VNI translation information 60 and 62 may, additionally or instead, be maintained at memory circuitry for control circuitry 30.

At block 74, one or more packet processors 32 on the network device such as device 10-2 (FIGS. 4-6) may perform VNI translation based on the maintained remote VNI to local VNI translation information 62 (and/or local VNI to remote VNI translation information 60). In particular, upon receiving a network packet, packet processor 32 may decapsulate the network packet to remove the VNI of the source domain (e.g., VNI VNI1 in the example of FIG. 4) and may encapsulate the decapsulated network packet to replace the VNI of the source domain with the VNI of the destination domain (e.g., VNI VNI2 in the example of FIG. 4). In such a manner, packet processor 32 of network device 10-2 may perform a remote VNI to local VNI translation and output a translated version of the network packet that contains the VNI of the destination domain (e.g., the local domain of network device 10-2).

In configurations in which network device 10-2 is configured to serve as an intermediate service device for traffic sourced from a first network domain and destined for a second network domain, the packet processor 32 may first perform a remote VNI to local VNI translation using remote VNI to local VNI information 62 associated with a network device of the first network domain and may then perform a local VNI to remote VNI translation using local VNI to remote VNI information 62 associated with a network device of the second network domain. In such a manner, packet processor 32 of network device 10-2 may output a translated version of the network packet that contains the VNI of the destination domain (e.g., the local domain of network device 10-3 in the example of FIG. 6).

The methods and operations described above in connection with FIGS. 1-7 may be performed by the components of one or more network devices and/or server or other host equipment using software, firmware, and/or hardware (e.g., dedicated circuitry or hardware). Software code for performing these operations may be stored on non-transitory computer readable storage media (e.g., tangible computer readable storage media) stored on one or more of the components of the network device(s) and/or server or other host equipment. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other host equipment (e.g., processing circuitry 28 in network device(s) 10-1, 10-2, 20A, 20B, and 20C, packet processor(s) 32 in network device(s) 10-1, 10-2, 10-3, 20A, 20B, and 20C, etc.).

The foregoing is merely illustrative and various modifications can be made to the described embodiments. The foregoing embodiments may be implemented individually or in any combination.

What is claimed is:

1. A method for operating a first border gateway for a first virtual network identifier (VNI) domain coupled, via an interconnect network, to a second border gateway for a second VNI domain, wherein the first and second border gateways are Ethernet Virtual Private Network (EVPN) peer devices, wherein the first VNI domain comprises a first EVPN site, wherein the second VNI domain comprises a second EVPN site, wherein the interconnect network is a datacenter interconnect network, and wherein an EVPN overlay is implemented over the datacenter interconnect network, the method comprising:

maintaining, by the first border gateway, remote VNI to local VNI translation information for the second border gateway based on an indication of a VNI translation capability of the second border gateway;

receiving, by the first border gateway, an EVPN route advertisement message containing the indication of the VNI translation capability of the second border gateway, wherein maintaining the remote VNI to local VNI translation information for the second border gateway is based on the received EVPN route route advertisement message;

receiving, by the first border gateway, a network packet from the second border gateway, wherein the received network packet contains a VNI of the second VNI domain; and outputting, by the first border gateway, a version of the network packet containing a VNI of the first VNI domain in place of the VNI of the second VNI domain based on the maintained remote VNI to local VNI translation information for the second border gateway.

2. The method of claim 1 further comprising:

processing, by the first border gateway, the received network packet to generate the output version of the network packet by translating the VNI of the second VNI domain to the VNI of the first VNI domain using the maintained remote VNI to local VNI translation information.

3. The method of claim 2, wherein translating the VNI of the second VNI domain to the VNI of the first VNI domain using the maintained remote VNI to local VNI translation information comprises decapsulating the received network packet containing the VNI of the second VNI domain and encapsulating the decapsulated network packet with the VNI of the first VNI domain using the maintained remote VNI to local VNI translation information.

4. The method of claim 1 wherein the EVPN route advertisement message contains the VNI of the second VNI domain and wherein the remote VNI to local VNI translation information includes the VNI of the second VNI domain as a remote VNI domain.

5. The method of claim 1 further comprising:

maintaining, by the first border gateway, local VNI to remote VNI translation information for the second border gateway;

receiving, by the first border gateway, an additional network packet, wherein the received additional network packet contains the VNI of the first VNI domain; and outputting, by the first border gateway, a version of the additional network packet containing the VNI of the second VNI domain in place of the VNI of the first VNI domain based on the maintained local VNI to remote VNI translation information for the second border gateway.

6. The method of claim 1, wherein the VNI of the second VNI domain comprises a first Virtual Extensible Local Area Network (VXLAN) identifier in a header of the network packet and wherein the VNI of the first VNI domain comprises a second VXLAN identifier in a header of the output version of the network packet.

7. The method of claim 1, wherein the indication of the VNI translation capability of the second border gateway comprises an attribute in the EVPN route advertisement message that is indicative of the second border gateway not being configured to perform local VNI to remote VNI translation for the network packet.

8. A network device for a first network domain comprising:

control circuitry configured to receive one or more advertisement messages from a peer network device for a second network domain and configured to maintain virtual network identifier (VNI) translation information for remote VNI to local VNI translation identifying a VNI of the second network domain based on the one or more advertisement messages from the peer network device and to maintain additional VNI translation information for local VNI to remote VNI translation identifying the VNI of the second network domain; and a packet processor configured to:

receive, from the peer network device, a first network packet destined for the first network domain and having the VNI of the second network domain;

perform a remote VNI to local VNI translation operation that replaces the VNI of the second network domain in the first network packet with a VNI of the first network domain based on the maintained VNI translation information;

receive, from the first network domain, a second network packet destined for the second network domain and having the VNI of the first network domain; and perform a local VNI to remote VNI translation operation that replaces the VNI of the first network domain in the second network packet with the VNI of the second network domain based on the maintained additional VNI translation information.

9. The network device defined in claim 8, wherein the control circuitry is configured to maintain the VNI translation information for the peer network device in response to determining that the peer network device is unable to perform downstream VNI translation for the first network packet.

10. The network device defined in claim 8, wherein the first network domain comprises a first Ethernet Virtual Private Network (EVPN) site, wherein the second network domain comprises a second EVPN site, and wherein the network device for the first network domain and the peer network device for the second network domain are EVPN speakers.

11. A method of operating a first network device of a first network domain coupled, via an interconnect network, to a second network device of a second network domain and coupled, via the interconnect network, to a third network device of a third network domain, the first network domain having a first virtual network identifier (VNI), the second network domain having a second VNI, the third network domain having a third VNI, and the method comprising:

maintaining, by the first network device, remote VNI to local VNI translation information for the second network device;

maintaining, by the first network device, local VNI to remote VNI translation information for the third network device;

receiving, by the first network device, network traffic having the second VNI from the second network device, the received network traffic being destined for the third network domain;

replacing, by the first network device, the second VNI in the received network traffic with the third VNI based on the remote VNI to local VNI translation information for the second network device and based on the local VNI to remote VNI translation information for the third network device; and forwarding, by the first network device, the network traffic having the third VNI to the third network device.

12. The method of claim 11, wherein the network traffic having the third VNI is forwarded to the third network device via the interconnect network.

13. The method of claim 11, wherein the first network device is a first gateway for the first network domain, wherein the second network device is a second gateway for the second network domain, and wherein the third network device is a third gateway for the third network domain.

14. The method of claim 11, wherein the second VNI in the received network traffic is replaced with the third VNI by performing remote VNI to local VNI translation from the second VNI to the first VNI and performing local VNI to remote VNI translation from the first VNI and to the third VNI.

15. The method of claim 11, wherein the received network traffic has the second VNI when output by the second network device and conveyed via the interconnect network.

16. The method of claim 15, wherein the second network device is not configured to perform local VNI to remote VNI translation for the network traffic and wherein the third network device is not configured to perform remote VNI to local VNI translation for the network traffic.

* * * * *